(12) United States Patent
Ubhayakar et al.

(10) Patent No.: US 11,820,278 B2
(45) Date of Patent: Nov. 21, 2023

(54) LAMP ASSEMBLY FOR A VEHICLE

(71) Applicant: Volvo Truck Corporation, Gothenburg (SE)

(72) Inventors: Chinmay Ubhayakar, Karnataka (IN); Akshay Natarajan, Chennai (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/920,095

(22) PCT Filed: Jul. 15, 2020

(86) PCT No.: PCT/EP2020/070029
§ 371 (c)(1),
(2) Date: Oct. 20, 2022

(87) PCT Pub. No.: WO2022/012747
PCT Pub. Date: Jan. 20, 2022

(65) Prior Publication Data
US 2023/0158945 A1    May 25, 2023

(51) Int. Cl.
*B60Q 1/26* (2006.01)
*B60Q 1/00* (2006.01)
(Continued)

(52) U.S. Cl.
CPC ......... *B60Q 1/2623* (2013.01); *B60Q 1/0088* (2013.01); *B60Q 1/18* (2013.01);
(Continued)

(58) Field of Classification Search
CPC ...... B60Q 1/0088; B60Q 1/18; B60Q 1/0035; B60R 16/03
See application file for complete search history.

(56) References Cited

U.S. PATENT DOCUMENTS 5,264,997 A * 11/1993 Hutchisson ............ H05B 47/00
439/11
2016/0079701 A1    3/2016 Liao
(Continued)

FOREIGN PATENT DOCUMENTS

CN    111271680 A    6/2020
DE    202018102945 U1    8/2019

OTHER PUBLICATIONS

International Search Report and Written Opinion for International Patent Application No. PCT/EP2020/070029, dated Mar. 19, 2021, 11 pages.

*Primary Examiner* — Julie A Bannan
(74) *Attorney, Agent, or Firm* — Withrow & Terranova, PLLC (57) ABSTRACT

A lamp assembly for a vehicle comprising a housing and a securing system for securing the lamp assembly to the vehicle body. The securing system is arranged in the housing and comprises at least one latch movable between a retracted position and a locking position;
  an electromagnet to attract a ferromagnetic member secured to the latch in order to move the latch to the locking position;
  a receiver coupled to a transmitter located inside the vehicle body, the receiver and the transmitter being part of a wireless power transfer device, the receiver being configured to power the electromagnet; and
  a retaining system configured to retain the latch in the locking position and which can be released to an inactive state for allowing the latch to move to the retracted position.

16 Claims, 5 Drawing Sheets

(51) Int. Cl.
*B60Q 1/18* (2006.01)
*B60R 16/03* (2006.01)

(52) U.S. Cl.
CPC ............ *B60R 16/03* (2013.01); *B60Q 1/0035* (2013.01); *B60Q 2900/30* (2013.01)

(56) References Cited

U.S. PATENT DOCUMENTS

2018/0009369 A1 1/2018 Badkin
2019/0277059 A1 9/2019 Robertson

\* cited by examiner

LAMP ASSEMBLY FOR A VEHICLE

This application is a 35 USC 371 national phase filing of International Application No. PCT/EP2020/070029, filed Jul. 15, 2020, the disclosure of which is incorporated herein by reference in its entirety.

TECHNICAL FIELD

The invention relates to a lamp assembly for a vehicle and to a vehicle comprising such a lamp assembly. The invention further relates to a method for mounting a lamp assembly on a vehicle body, and to a method for disassembling a lamp assembly.

The invention can be applied in light, medium and heavy-duty vehicles, such as trucks, buses and construction equipment. However, the invention can be applied to other types of vehicles, such as passenger cars.

BACKGROUND

Vehicles are equipped with several lamp assemblies having various functions such as lighting or signalling functions.

Conventionally, a lamp assembly is secured to the outer face of the vehicle by fastening arrangements such as bolts and nuts. For that purpose, the vehicle body is provided with through holes for receiving the fasteners and also the electric wires which connect the lamp assembly to a power source located inside the vehicle body.

However, having through holes in the vehicle body leads to the risk of water entry. Ultimately, this can cause corrosion of the fasteners, which may require most frequent replacement and make this replacement problematic. Other consequences may be corrosion of the vehicle body, or entry of water into the passenger's compartment.

Seals are generally provided to prevent water entry. However, an efficient sealing interface is an expensive solution, and requires a high level of maintenance.

SUMMARY

An object of the invention is to provide a lamp assembly for a vehicle which is robust and requires little maintenance.

According to one aspect, the invention relates to a lamp assembly for a vehicle, intended to be mounted in a recess of a body of the vehicle, the lamp assembly having a housing and a securing system for securing the lamp assembly to the vehicle body, wherein the securing system is arranged in the housing and comprises:
  at least one latch that is movable between a retracted position in which the latch is substantially fully located inside the housing, and a locking position in which the latch at least partially projects out from the housing to be able to engage in a cavity arranged in the recess of the vehicle body;
  an electromagnet capable, when powered, to attract a ferromagnetic member secured to the latch, in order to move the latch to the locking position;
  a receiver capable of being coupled to a transmitter located inside the vehicle body, said receiver and said transmitter being part of a wireless power transfer device, the receiver being configured to power the electromagnet;
  a retaining system which, in an active state, is configured to retain the latch in the locking position and which can be released to an inactive state for allowing the latch to move to the retracted position.

Owing to the invention, there is no need to provide through holes in the vehicle body. Indeed, securing the lamp assembly to the vehicle body is achieved by a latch engaged in a cavity, which is not a through hole. Moreover, the electric connection between the lamp assembly located outside the vehicle and the power source located inside the vehicle is provided by a wireless power transfer device.

As a consequence, the invention avoids the issue of water entry into the vehicle and does not require implementing expensive sealing solutions. The lamp assembly therefore has an increased robustness and durability, and may last during the entire life-span of the vehicle, without service or replacement.

Another advantage of the invention derives from the fact that the securing system is arranged in the housing. With such non-visible fasteners, the lamp assembly design can meet the high expectations from a premium brand. Moreover, it improves the vehicle aerodynamics and thus its efficiency. However, the securing system design allows easily mounting and disassembling the lamp assembly despite the fact that the fasteners—here the latches—are not directly accessible to an operator.

The lamp assembly according to the invention can be easily mounted on the vehicle and disassembled. There is no need to open the housing during these operations.

In practice, before the lamp assembly is mounted, the latch is preferably in the retracted position. The lamp assembly may comprise at least one biasing member configured to bias the latch towards the retracted position. The terms "the latch is substantially fully located inside the housing" may include a configuration in which the latch projects out from the housing over a very small distance, this distance being small enough to prevent locking.

Alternatively, before the lamp assembly is mounted, the latch can be in the locked position, but capable of moving towards the retracted position while being pushed onto the vehicle body when the lamp assembly is being mounted.

Power is required to trigger the mounting process, i.e. the movement of the latch due to the electromagnet. In this respect, it has to be noted that a reverse configuration is possible, namely with the electromagnet provided on the latch and the ferromagnetic member secured to the housing. However, once the latch is in the locking position, the securing system is electrically passive, i.e. does not require power, as the latch can be mechanically maintained in this position by means of the retaining system.

In an embodiment, the retaining system comprises a retaining member and at least one biasing member configured to bias the retaining member towards the active state. In the active state of the retaining member and in the locking position of the latch, a projection secured to the latch may cooperate with the retaining member to prevent the latch from moving to its retracted position.

The securing system can be configured so that the movement of the latch from the retracted position towards the locking position causes the projection to move the retaining member towards its inactive state against the force of the biasing member until the projection has moved past the retaining member, the projection then being snapped on the retaining member which has returned to the active state by means of the biasing member.

For example, the retaining member comprises a bar. The bar can have a triangular cross-section. The lamp assembly can comprise two latches configured to move along parallel sliding axes between the retracted position and the locking position, said sliding axes being orthogonal to the main direction of the bar.

The securing system may further comprise a releasing member which is configured to be actuated from the outside of the lamp assembly by a user, for moving the retaining system to the inactive state, and ultimately allowing removing the lamp assembly from the vehicle body.

In an embodiment, the housing has a lens, a rear wall opposite the lens, and a peripheral wall. The lens is the transparent or translucent wall through which the light is emitted. The lens can include optics or not. It can be made of a plastic material. One wall of the housing, preferably the peripheral wall, has at least one hole for the at least one latch in the locking position to pass therethrough.

In an embodiment, one wall of the housing, preferably the rear wall, has at least one pattern which is depressed or raised and which is configured to cooperate with a corresponding pattern arranged in the recess of the vehicle body for prepositioning the lamp assembly in said recess before the lamp assembly is secured to the vehicle body. By "depressed" is meant "protruding towards the inside of the housing; by "raised" is meant "protruding towards the outside of the housing". Such an arrangement ensures that the latch faces the cavity of the recess. This may not be easy to achieve otherwise, as the latch is hidden in the housing or hard to see through the lens of the housing.

The receiver can be one of a capacitive plate and an induction coil. However, other wireless power transfer devices could be envisaged. In an embodiment, the receiver comprises a plate which is mounted adjacent the housing rear wall, and said plate has at least one hole for receiving a depressed pattern arranged in the housing rear wall.

According to another aspect, the invention relates to a vehicle having a body in which at least one recess is formed, the recess being open towards the outside of the vehicle, the vehicle comprising a lamp assembly as previously described. The lamp assembly is mounted in the recess and secured to the vehicle body. The recess has at least one cavity in which a latch of the lamp assembly can be engaged. The vehicle further comprises a transmitter which is located inside the vehicle body, substantially adjacent a recess wall, and which can be connected to a vehicle battery for allowing wireless power transfer to the receiver of the lamp assembly.

In an embodiment, the housing of the lamp assembly has a lens, and said lens is substantially level with the portion of the vehicle body which surrounds the recess. This brings significant advantages in terms of design, impact protection and aerodynamics.

According to another aspect, the invention relates to a method for mounting a lamp assembly on a vehicle body, to form a vehicle as previously described. The method comprises:
  positioning the lamp assembly in the recess, the latch being in the retracted position;
  powering the transmitter thus, as a consequence of the wireless power transfer device, powering the receiver, thereby powering the electromagnet and causing the latch to move to the locking position to engage the cavity of the recess, the latch then being retained in the locking position by the retaining system in the active state.

According to still another aspect, the invention relates to a method for disassembling a lamp assembly, in a vehicle as previously described. The method comprises, starting from an unpowered condition of the transmitter:
  releasing the retaining system to the inactive state, resulting in the latch being freed and moving to the retracted position, for example by means of at least one biasing member configured to bias the latch towards the retracted position;
  removing the lamp assembly from the vehicle body.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
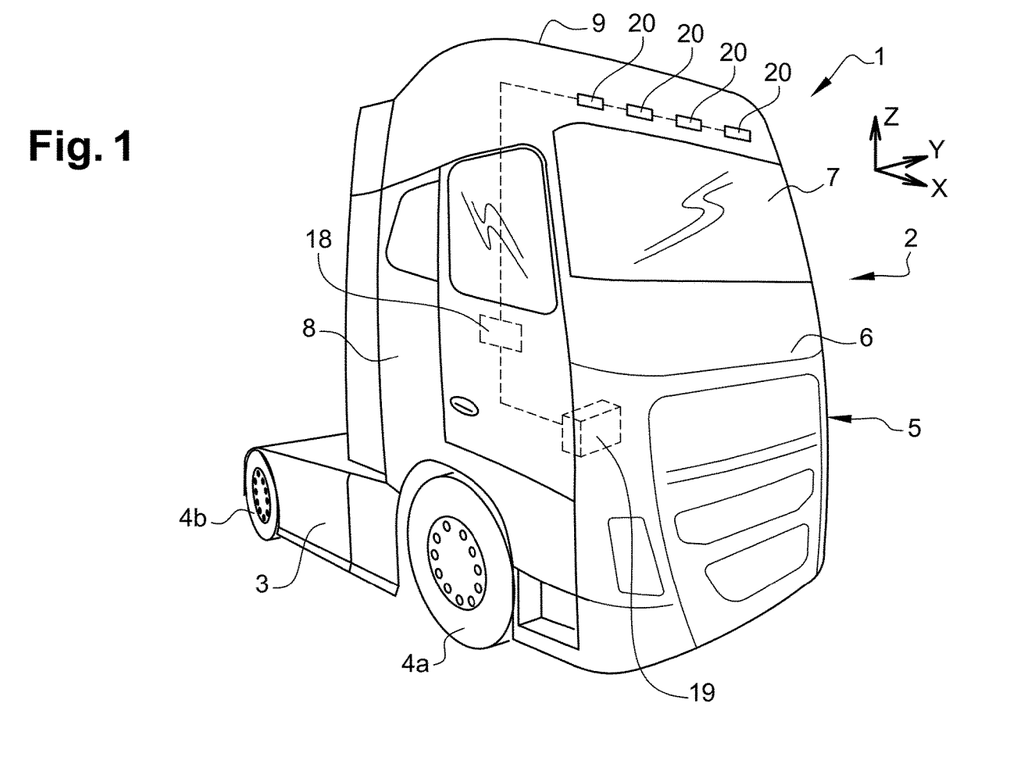
FIG. 1 is a perspective view of a vehicle comprising several lamp assemblies according to the invention.

FIG. 1 shows a vehicle 1, more specifically an industrial vehicle. Although the invention will be described with respect to a truck, the invention is not restricted to this particular vehicle, but may also be used in other vehicles, such as a bus.

As shown in FIG. 1, Z is defined as the vertical direction, X is defined as the longitudinal direction of the vehicle 1, and Y is defined as the transversal direction of the vehicle 1.

The vehicle 1 comprises a tractor 2 including a chassis 3 supported by front wheels 4a and rear wheels 4b and a cab 5 which can be mounted on the chassis 2 through suspensions. The cab 5 comprises a front wall 6 provided with a windscreen 7, side walls 8 and a roof 9. It defines a driver compartment. The vehicle 1 comprises a body 10 which is defined as the frame structure including in particular the front wall 6, side walls 8 and roof 9.

Figure 2:
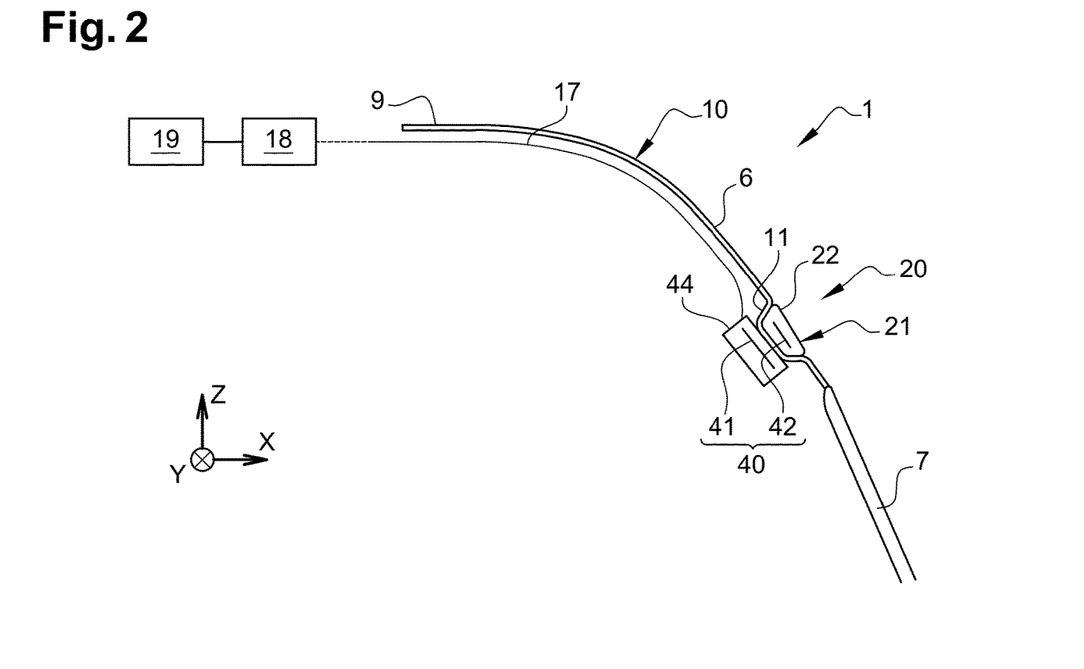
FIG. 2 is a schematic cross-section in a vertical longitudinal plane of the vehicle of FIG. 1.

In the configuration of FIG. 2, the vehicle 1 comprises only the tractor 2. However, the vehicle 1 is also configured to include a trailer (not shown) connected to the tractor 2.

The vehicle 1 further comprises at least one lamp assembly 20 secured to the vehicle body 10. For that purpose, at least one recess 11 is formed in the vehicle body 10, the recess 11 being open towards the outside of the vehicle 1 and receiving the lamp assembly 20. The recess 11 has a rear wall 13 opposite the recess opening, and a peripheral wall 14.

The vehicle 1 may comprise several lamp assemblies 20 which are mounted in corresponding recesses 11 of the vehicle body 10. In a non-limiting embodiment, as shown in FIG. 1, the lamp assemblies 20 are mounted on the cab 5, preferably along a transverse line above the vehicle windshield 7, and thus can form clearance marker lamps. However, the invention can apply to lamp assemblies having other functions and/or other locations on a vehicle.

Figure 4:
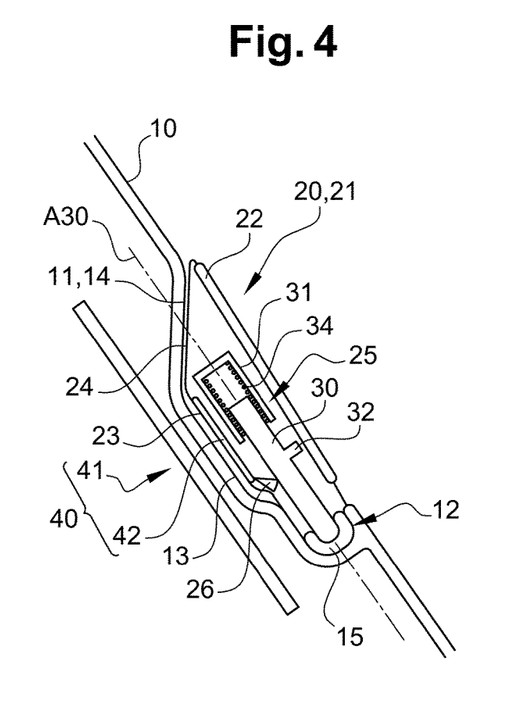
FIG. 4 is a schematic and enlarged cross-section in vertical longitudinal plane $P_{IV}$ of FIG. 3, $P_{IV}$ being defined as including axis A30 of a latch of a securing system of the lamp assembly.
Figure 9:
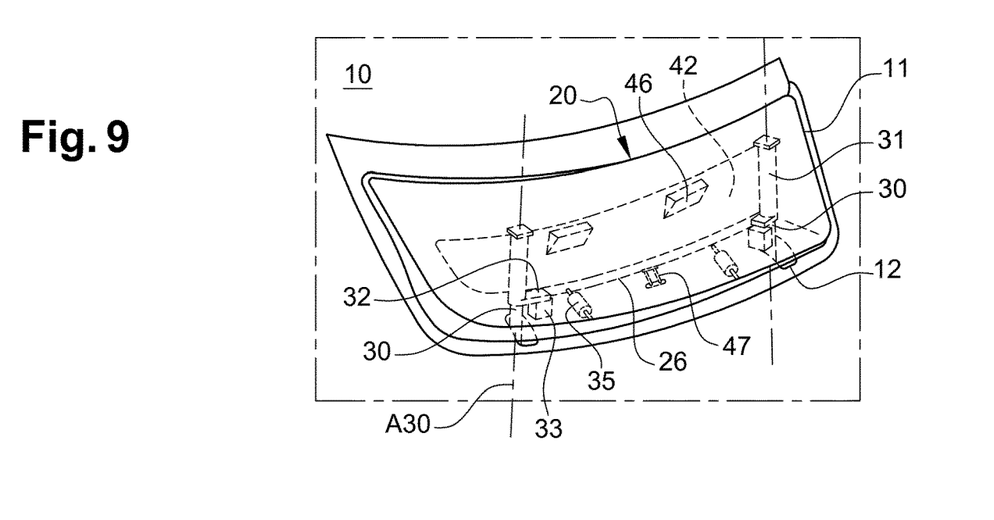

The lamp assembly 20 has a housing 21 which comprises a lens 22, a rear wall 23 opposite the lens 22, and a peripheral wall 24. Preferably, the housing 21 has substantially the same shape as that of the recess 11, so that the lamp assembly 20 can be mounted in the recess 11 and fit into said recess 11. In addition, the lens 22 may be substantially level with the portion of the vehicle body 10 which surrounds the recess 11, as can be seen in FIGS. 4 and 9 for example. This brings significant advantages in terms of aesthetics, aerodynamics and impact protection.

The lamp assembly 20 comprises one or several light sources (not shown) which are located inside the housing 21, and which have appropriate lighting or signalling functions in accordance with the intended use of the lamp assembly 20. The lens 22 of the housing 21 must allow the light emitted by the light source(s) to be transmitted towards the outside with the required properties in terms of light intensity and distribution.

The vehicle 1 also comprises an electronic control unit 18 and a battery 19 connected to said electronic control unit 18. The connection can be achieved by wires 17. The battery 19 can provide power to the light source(s) and other components of the lamp assembly 20, in particular for allowing securing the lamp assembly 20 to the vehicle body 10 as will be explained hereinafter.

The lamp assembly 20 comprises a securing system 25 for securing the lamp assembly 20 to the vehicle body 10. The securing system 25 is arranged in the housing 21. Preferably, the securing system 25 is fully housed in the housing 21, before the lamp assembly 20 is mounted in the recess 11.

Figure 3:
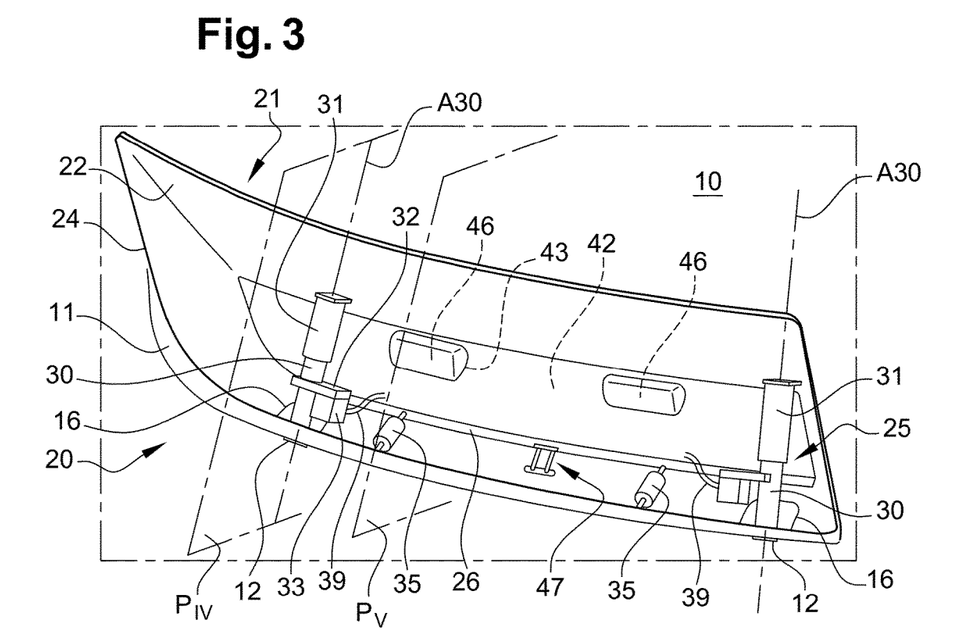
FIG. 3 is a front view of a lamp assembly mounted on the vehicle body.
Figure 7:
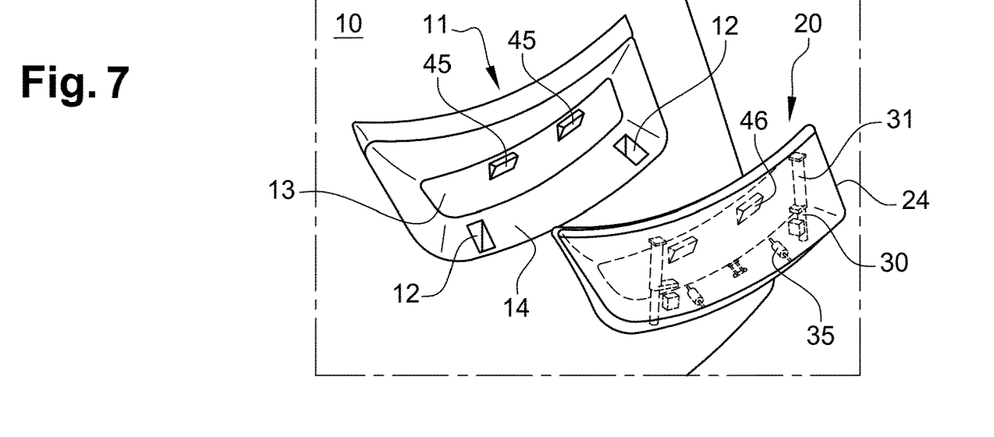
FIGS. 7 to 9 show successive steps of a method for mounting the lamp assembly on the vehicle body.

The securing system 25 comprises at least one latch 30 that is movable between a retracted position in which the latch 30 is substantially fully located inside the housing 21 (FIG. 7), and a locking position in which the latch 30 at least partially projects out from the housing 21 (FIGS. 3 and 9). For that purpose, the peripheral wall 24 of the housing 21 has a hole 16 for allowing the latch 30 to pass through and extend outside the housing 21.

In the locking position, the latch 30 is engaged in a cavity 12 arranged in the recess 11 of the vehicle body 10, the cavity 12 not being a through hole. In an embodiment, as represented in FIG. 4, the latch 30 is not directly engaged in the cavity 12 but received in a receiving member 15 which is arranged in the cavity 12 and which opens towards the inside of the recess 11. The receiving member 15 may comprise a non-threaded nut. It is preferably assembled to the vehicle body 10 without requiring holes in the vehicle body 10. For example, the receiving member 15 can be integrated in the vehicle body 10 by insert moulding or any other appropriate post operation method, such that the interface between the receiving member 15 and the vehicle body 10 is completely sealed.

The latch 30 may be arranged to slide in a sleeve 31 secured to the housing 21, along a sliding axis A30. With the arrangement shown in FIG. 1, the sliding axis A30 may be substantially vertical, i.e. parallel to vertical direction Z.

The lamp assembly 20 preferably comprises a biasing member 34 (such as a helical spring) configured to bias the latch 30 towards the retracted position, as can be seen in FIG. 4.

For better securing the lamp assembly 20 to the vehicle body 10, the lamp assembly 20 may comprise two latches 30 configured to move along parallel sliding axes A30 between the retracted position and the locking position. Preferably, the latches 30 may be arranged near opposite sides of the lamp assembly 20, as seen in FIG. 3.

The securing system 25 also comprises a retaining system which, in an active state, is configured to retain the latch 30 in the locking position and which can be released to an inactive state for allowing the latch 30 to move to the retracted position, for example under the action of the biasing member 34.

Figure 10:
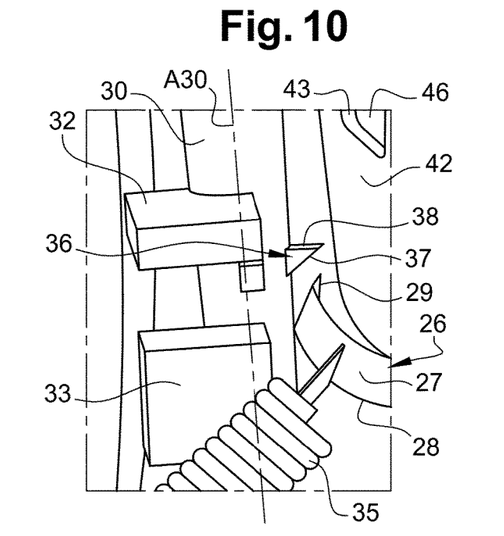
FIGS. 10 and 11 are detailed views of the securing system of the lamp assembly, respectively with the latch in the retracted position and with the latch retained in the locking position by the retaining system.

In the non-limited illustrated embodiment, the retaining system has a retaining member comprising or consisting of a bar 26 which preferably extends orthogonal to the sliding axes A30 and adjacent the housing rear wall 23. The bar 26 may be engaged in side apertures 29 of the housing, as can be seen in FIG. 10.

Figure 5:
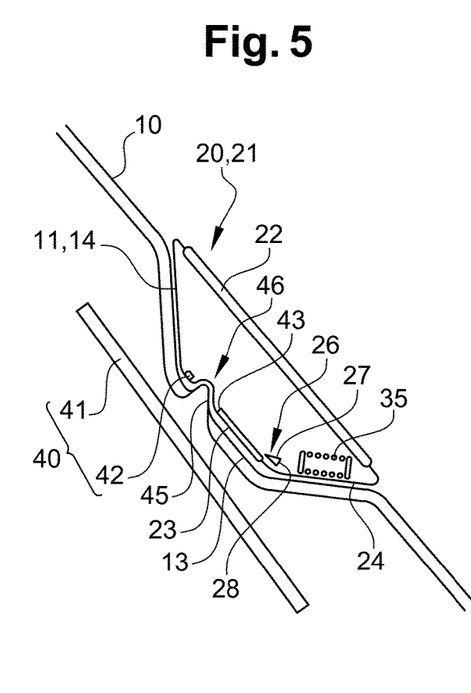
FIG. 5 is a schematic and enlarged cross-section in vertical longitudinal plane $P_V$ of FIG. 3, $P_V$ being defined as passing through a biasing member of a retaining system of the lamp assembly.

The bar 26 may have a triangular cross-section having a front face 27 forming a ramp and a bottom face 28 forming a locking surface (see FIG. 5). The latch 30 comprises a projection 36 having a ramp-like bottom face 37 and a locking upper face 38, as shown in FIG. 10. In the active state of the retaining member 26 and in the locking position of the latch 30, the projection 36 cooperates with the retaining member 26 to prevent the latch 30 from moving to its retracted position.

The retaining system further has at least one biasing member which is configured to bias the retaining member 26 towards the active state. This biasing member may be a spring 35, such as a helical spring, having one end secured to the lens 22 and one opposite end secured to the retaining member 26. The spring 35 can be an extension spring.

The securing system 25 further comprises an electromagnet 33 which is secured to the housing 21. When powered, the electromagnet 33 is capable of attracting a ferromagnetic member secured to the latch 30, in order to move the latch 30 to the locking position. The ferromagnetic member may comprise a tab 32 extending orthogonally to the latch 30.

It results from the above description that the mechanical features ensuring the locking of the lamp assembly 20 inside the recess 11—namely basically the latch 30 and cavity 12—do not require through-holes in the vehicle body 10.

Moreover, actuating the securing system 25 neither requires such through-holes, as the invention makes use of a wireless power transfer device 40.

To that end, the vehicle 1 comprises a transmitter 41 which is located inside the vehicle body 10 and which is connected to the battery 19, and the lamp assembly 20 comprises a receiver 42 which is located inside the housing 21. The transmitter 41 and receiver 42 are part of the wireless power transfer device 40, the transmitter 41 allowing wireless power 35 transfer to the receiver 42. The transmitter 41 and receiver 42 can be capacitive plate, or induction coils. The transmitter 41 can be housed in an inner module 44 as shown in FIG. 2.

Figure 6:
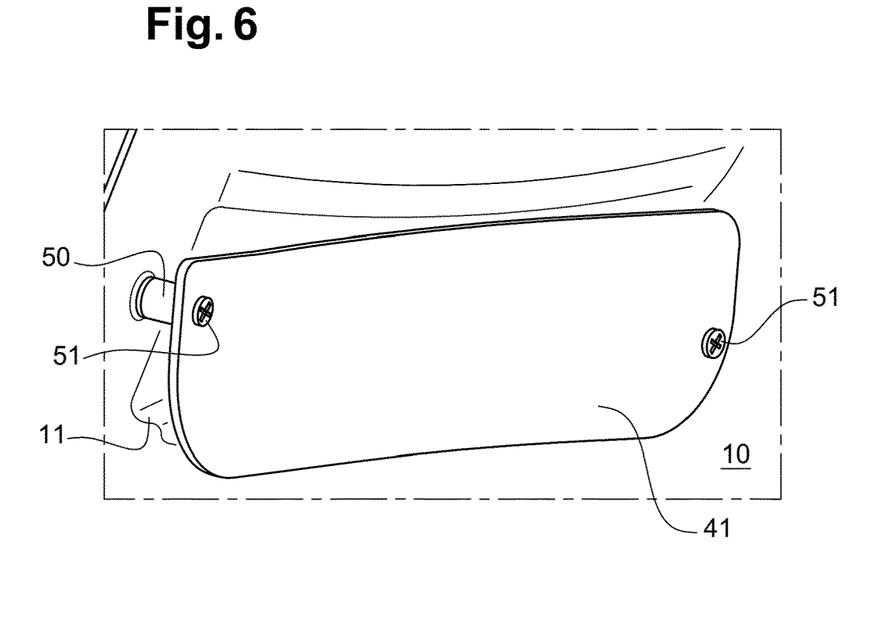
FIG. 6 is a detailed view of the vehicle body from the inside, near the lamp assembly.

The transmitter 41, or inner module 44, is secured to the vehicle body with any mounting arrangement not requiring holes. For that purpose, according to an embodiment shown in FIG. 6, there may be provided embossments 50 protruding from the vehicle body 10 towards the inside, on opposite sides of the recess 11. The embossments 50 are made by moulding or other appropriate post operation and therefore are part of the vehicle body 10 or secured to the vehicle body 10 without holes. The embossments 50 may have threaded inserts for receiving fasteners 51 for securing the transmitter 41.

Thus, basically, the lamp assembly 20 derives power and communication wirelessly from the inner module 44.

For the wireless power transfer device 40 to work, there is no need to provide through holes in the vehicle body 10 for receiving wires; however, the transmitter 41 and receiver 42 must be fairly close to one another. In an embodiment, the transmitter 41 is arranged substantially adjacent the recess rear wall 13, while the receiver 42 is arranged substantially adjacent the housing rear wall 23, therefore facing the transmitter 41. As shown in FIGS. 2, 4 and 5, with such a configuration, the transmitter 41 and receiver 42 are only separated by a wall of the vehicle body 10.

The receiver 42 can provide the power transmitted by the transmitter 41 to components inside the housing 21 of the lamp assembly 20, including light source(s) and the electromagnet 33. Inside the housing 21, wires or tracks on a circuit board (not shown) electrically connect the receiver 42 to the components which need power. FIG. 3 schematically shows wires 39 which electrically connect the electromagnets 33 and the receiver 42.

According to a possible feature of the invention, one wall of the recess 11 of the vehicle body 10 can have at least one pattern which is depressed or raised. This pattern in the recess 11 is configured to cooperate with a corresponding pattern arranged in one wall of the lamp assembly housing 21, for prepositioning the lamp assembly 20 in said recess 11 before the lamp assembly 20 is secured to the vehicle body 10.

In the non-limited represented embodiment, on the one hand, the rear wall 13 of the recess has two patterns 45 which are raised, i.e. which protrude towards the inside of the recess 11. On the other hand, the rear wall 23 of the housing 21 has two patterns 46 which are depressed, i.e. which protrude towards the inside of the housing 21.

The receiver 42 may comprise a plate which is mounted adjacent the housing rear wall 23. Then, said plate-shaped receiver 42 has one or several holes 43 for receiving the depressed pattern(s) 46 arranged in the housing rear wall 23, as shown in FIGS. 3 and 5.

Reference is now made to FIGS. 7 to 11 which shows steps of a method for mounting the lamp assembly 20 on the vehicle body 10.

In the lamp assembly 20 ready for being mounted, the latches 30 are in the retracted position, because of springs 34, and therefore do not project, or project only very slightly, outside the housing 21. As shown in FIG. 10, the projection 36 on the latch 30 is spaced apart from the retaining member 26.

Figure 8:
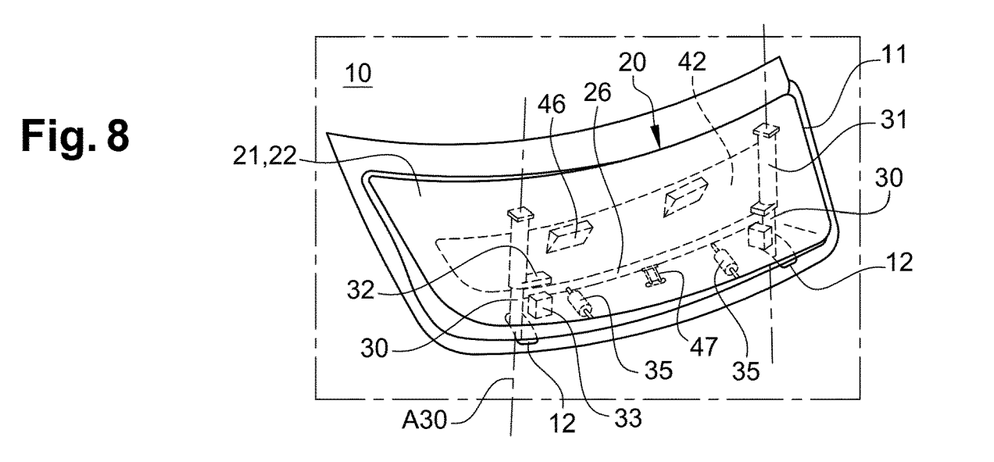

First of all, the lamp assembly 20 is positioned in the recess 11 so that the axes 30 of the latches 30 coincide with the cavities 12 (FIG. 8). This might be fairly easy if the shapes of the housing 21 and recess 11 are substantially identical. Mutually engaging the patterns 45 of the vehicle body 10 and 46 of the lamp assembly 20 further improves the positioning, and may even provide some temporary hold.

Then, the transmitter 41 is powered, typically by switching on the vehicle ignition. As a consequence, the receiver 42 is also powered, and the electromagnet 33 is powered in turn. Attraction of the ferromagnetic member 32 by the electromagnet 33 causes the latch 30 to move to the locking position, against the force of the biasing member 34, the latch 30 projecting out of the housing 21 through holes 16 and engaging the cavity 12 of the recess 11 (FIG. 9).

As the latch 30 moves towards the locking position, the projection 36 on the latch 30 moves closer to the retaining member 26 until the ramp-like bottom face 37 of the projection 36 comes into contact with the front face 27 of the retaining member 26. Further movement of the latch 30 towards the locking position results in the projection 36 pushing the retaining member 26 to move it towards its inactive state against the force of the biasing member 35, until the projection 36 has moved past the retaining member 26. Then, the projection 36 is snapped on the retaining member 26 which has returned to the active state by means of the biasing member 35. The locking upper face 38 of the projection 36 on the latch 30 abuts the bottom face 28 of the retaining member 26, so that the latch 30 is retained in the locking position by the retaining system 26 in the active state (FIG. 11).

In the locking position, the latch 30 remains engaged in the cavity 12—i.e. the lamp assembly 20 remains secured to the vehicle body 10—even if the transmitter 41, receiver 42 and electromagnet 33 are not powered any more as a result of the vehicle ignition being turned off, and despite the biasing member 34. The securing system 25 of the invention is electrically activated but then mechanically held in locking position.

In case the lamp assembly 20 needs to be disassembled, an operator can follow the now described steps, with reference to FIGS. 12 to 15.

Figure 11:
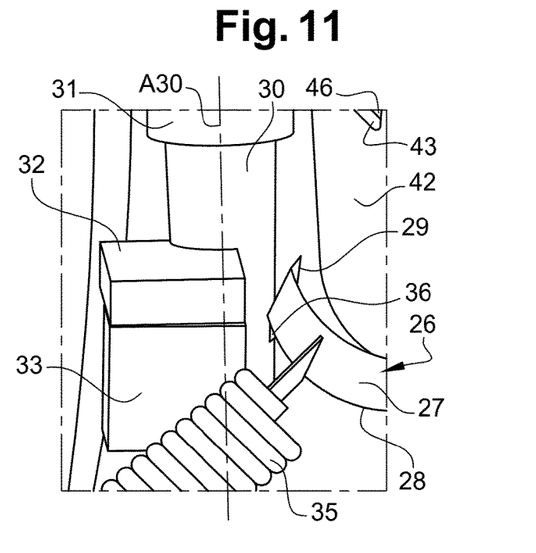
Figure 12:
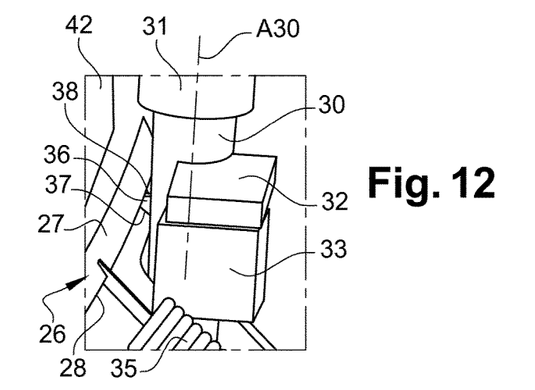
FIGS. 12 to 14 show successive steps of a method for disassembling the lamp assembly.

The vehicle 1 is in the condition depicted in FIGS. 9, 11 and 12, namely: the latches 30 are engaged in cavities 12 and held in the locking position by the retaining member 26. Furthermore, the vehicle ignition is off. In other words, the transmitter 41 is in an unpowered condition, meaning that the electromagnet 33 does not attract the ferromagnetic member 32 provided on the latch 30.

The securing system 25 comprises a releasing member 47 which is configured to be actuated from the outside of the lamp assembly 20 by a user, for moving the retaining system to the inactive state.

Figure 13:
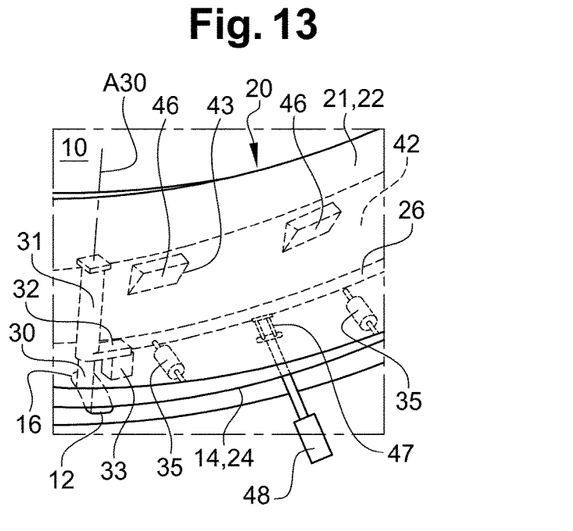
Figure 15:
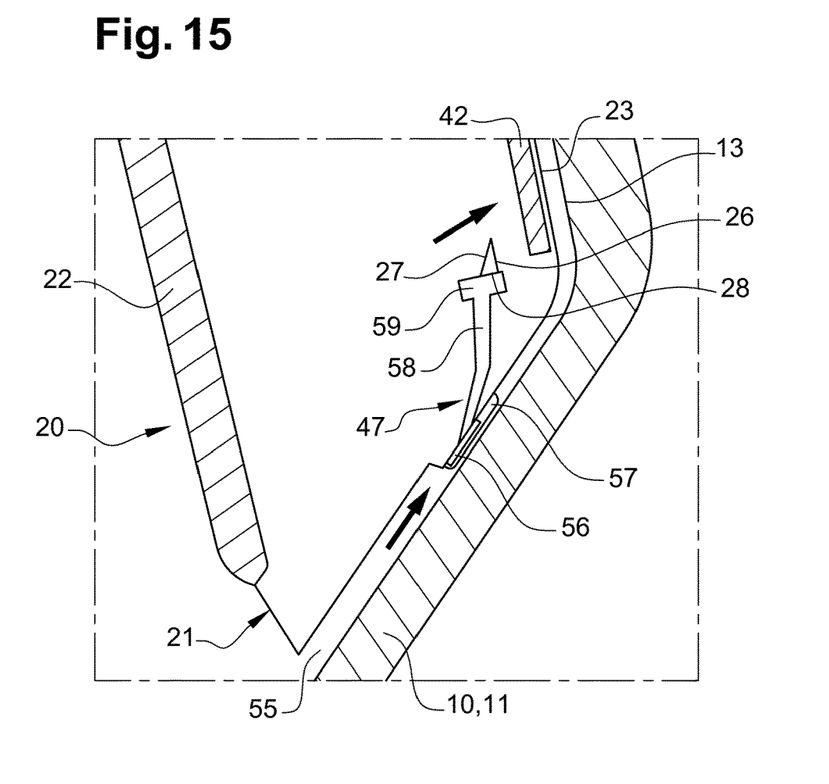
FIG. 15 is a detailed view of the lamp assembly showing a step of the disassembling method.

For example, when the lamp assembly 20 is received in the recess 11, there can remain a small gap 55 between the wall of the housing 21 which is adjacent the releasing member 47 and the facing wall of the recess 11 (see FIG. 15). Said wall of the housing 21 may be the wall provided with the holes 16. Such a gap 55 allows a user to access and actuate the releasing member 47, typically by means of a tool 48 inserted in said gap 55 (FIG. 13). The tool can be a screwdriver.

For example, actuating the releasing member 47 results in pushing the retaining member 26 to move it towards its inactive state against the force of the biasing member 35.

More specifically, as shown in FIG. 15, the releasing member 47 may include a base 56 arranged in a hollow 57 of the housing 21 and secured to an arm 58 having an enlarged end 59. The enlarged end 59 is located close to the retaining member or bar 26, preferably substantially in contact with the bottom face 28 of the retaining member 26. The hollow 57 has a greater dimension than the base 56 of the releasing member 47. Thus, the base 56 can be pushed to move inside the hollow 57, here towards the rear wall 23 of the housing 21. This results in the arm 58 pushing the retaining member 26 towards its inactive state.

Figure 14:
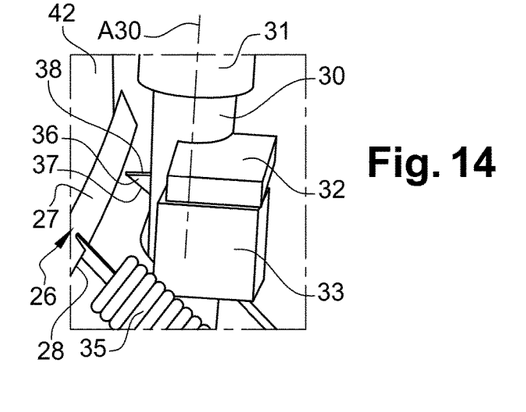

Once the user has released the retaining system to the inactive state by actuating the releasing member 47, the latch 30 is freed from the retaining member 26 and, as it is not attracted by the electromagnet 33, moves to the retracted position (FIG. 14). This can be achieved by means of the biasing member 34.

The lamp assembly 20 can then be removed from the vehicle body 10.

Because of the robust design of the lamp assembly securing system according to the invention, disassembling should only be necessary to replace a damaged lamp assembly, but should not be required for maintenance.

One significant improvement brought by the invention relies in avoiding through holes in the vehicle body. Moreover, the invention provides a straight forward and intuitive way of mounting and securing the lamp assembly on the vehicle body. Besides, the invention does not require any particularly sophisticated arrangement on the vehicle body.

In addition to the previously mentioned advantages of the invention, it should be noted that the wireless power transfer device provides a wireless communication link which enables the electronic identification of the lamp assembly for aftermarket and warehouse traceability through contactless methods.

It is to be understood that the present invention is not limited to the embodiments described above and illustrated in the drawings; rather, the skilled person will recognize that many changes and modifications may be made within the scope of the appended claims.

The invention claimed is:

1. A lamp assembly for a vehicle, intended to be mounted in a recess of a body of the vehicle, the lamp assembly having a housing and a securing system for securing the lamp assembly to the vehicle body, wherein the securing system is arranged in the housing and comprises:
   at least one latch that is movable between a retracted position in which the latch is substantially fully located inside the housing, and a locking position in which the latch at least partially projects out from the housing to be able to engage in a cavity arranged in the recess of the vehicle body;
   an electromagnet capable, when powered, to attract a ferromagnetic member secured to the latch, in order to move the latch to the locking position;
   a receiver capable of being coupled to a transmitter located inside the vehicle body, the receiver and the transmitter being part of a wireless power transfer device, the receiver being configured to power the electromagnet; and
   a retaining system which, in an active state, is configured to retain the latch in the locking position and which can be released to an inactive state for allowing the latch to move to the retracted position.

2. The lamp assembly of claim 1, wherein the retaining system comprises a retaining member and at least one biasing member configured to bias the retaining member towards the active state, wherein, in the active state of the retaining member and in the locking position of the latch, a projection secured to the latch cooperates with the retaining member to prevent the latch from moving to its retracted position.

3. The lamp assembly of claim 2, wherein the securing system is configured so that the movement of the latch from the retracted position towards the locking position causes the projection to move the retaining member towards its inactive state against the force of the biasing member until the projection has moved past the retaining member, the projection then being snapped on the retaining member which has returned to the active state by means of the biasing member.

4. The lamp assembly of claim 2, wherein the retaining member comprises a bar preferably having a triangular cross-section.

5. The lamp assembly of claim 4, wherein the lamp assembly comprises two latches configured to move along parallel sliding axes between the retracted position and the locking position, the sliding axes being orthogonal to the main direction of the bar.

6. The lamp assembly of claim 1, wherein the securing system further comprises a releasing member which is configured to be actuated from the outside of the lamp assembly by a user, for moving the retaining system to the inactive state.

7. The lamp assembly of claim 1, wherein the receiver is one of a capacitive plate and an induction coil.

8. The lamp assembly of claim 1, wherein the housing has a lens, a rear wall opposite the lens, and a peripheral wall, wherein one wall of the housing, preferably the peripheral wall, has at least one hole for the at least one latch in the locking position to pass therethrough.

9. The lamp assembly of claim 8, wherein one wall of the housing, preferably the rear wall, has at least one pattern which is depressed or raised and which is configured to cooperate with a corresponding pattern arranged in the recess of the vehicle body for prepositioning the lamp assembly in the recess before the lamp assembly is secured to the vehicle body.

10. The lamp assembly of claim 9, wherein the receiver comprises a plate which is mounted adjacent the housing rear wall, and wherein the plate has at least one hole for receiving a depressed pattern arranged in the housing rear wall.

11. A vehicle having a body in which at least one recess is formed, the recess being open towards the outside of the vehicle, the vehicle comprising the lamp assembly of claim 1, the lamp assembly being mounted in the recess and secured to the vehicle body, the recess having at least one cavity in which a latch of the lamp assembly can be engaged, the vehicle further comprising a transmitter which is located inside the vehicle body, substantially adjacent a recess wall, and which can be connected to a vehicle battery for allowing wireless power transfer to the receiver of the lamp assembly.

12. The vehicle of claim 11, wherein the housing of the lamp assembly has a lens, and wherein the lens is substantially level with the portion of the vehicle body which surrounds the recess.

13. The vehicle of claim 11, wherein one wall of the recess of the vehicle body has at least one pattern which is depressed or raised and which is configured to cooperate with a corresponding pattern arranged in one wall of the lamp assembly housing for prepositioning the lamp assembly in recess before the lamp assembly is secured to the vehicle body.

14. The vehicle of claim 11, further comprising several lamp assemblies mounted in corresponding recesses of the vehicle body, the lamp assemblies being preferably mounted on a vehicle cab, preferably along a transverse line above a vehicle windshield.

15. A method for mounting a lamp assembly on a vehicle body, to form the vehicle of claim 11, wherein the method comprises:
   positioning the lamp assembly in the recess, the latch being in the retracted position; and
   powering the transmitter thus, as a consequence of the wireless power transfer device, powering the receiver, thereby powering the electromagnet and causing the latch to move to the locking position to engage the cavity of the recess, the latch then being retained in the locking position by the retaining system in the active state.

16. A method for disassembling a lamp assembly in the vehicle of claim 11, wherein the method comprises, starting from an unpowered condition of the transmitter:
   releasing the retaining system to the inactive state, resulting in the latch being freed and moving to the retracted position; and
   removing the lamp assembly from the vehicle body.

* * * * *